US012494604B2

(12) United States Patent
Hashiguchi

(10) Patent No.: US 12,494,604 B2
(45) Date of Patent: Dec. 9, 2025

(54) CONNECTOR ASSEMBLY

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 341 days.

(21) Appl. No.: 18/097,604

(22) Filed: Jan. 17, 2023

(65) Prior Publication Data

US 2023/0261418 A1 Aug. 17, 2023

(30) Foreign Application Priority Data

Feb. 14, 2022 (JP) ................................ 2022-020340

(51) Int. Cl.
*H01R 13/62* (2006.01)
*H01R 13/115* (2006.01)
*H01R 13/627* (2006.01)

(52) U.S. Cl.
CPC ....... *H01R 13/6271* (2013.01); *H01R 13/115* (2013.01)

(58) Field of Classification Search
None
See application file for complete search history.

(56) References Cited

U.S. PATENT DOCUMENTS 9,300,064 B2 3/2016 Takenaga et al.
9,728,882 B1 8/2017 Nakazawa
10,516,228 B2 12/2019 Takenaga et al.
10,566,723 B2 * 2/2020 Ueda ...................... H01R 13/24
2013/0137307 A1 5/2013 Huang et al.

FOREIGN PATENT DOCUMENTS

JP 2012155930 A 8/2012
JP 2015135806 A 7/2015
JP 2017204433 A 11/2017
JP 2017212035 A 11/2017
JP 2018107048 A 7/2018
JP 2018133334 A 8/2018
JP 2019046670 A 3/2019

OTHER PUBLICATIONS

Japanese Office Action (and an English language translation thereof) dated Oct. 29, 2025, issued in counterpart Japanese Application No. 2022-020340.

* cited by examiner

*Primary Examiner* — Ross N Gushi
(74) *Attorney, Agent, or Firm* — Holtz, Holtz & Volek PC

(57) ABSTRACT

A connector assembly is provided with a first connector and a second connector. In the first connector, a first contact point portion, a first indented portion, a first lock portion and a regulated portion of a first terminal are supported by a spring portion. A first holding member holding the first terminal has a regulating portion. The regulated portion is located downward of the regulating portion and faces the regulating portion. In the second connector, a second terminal held by a second holding member has an insertion end portion, a second contact point portion, a second indented portion and a second lock portion. In a mated state, the first lock portion and the second lock portion are located between the first indented portion and the second indented portion and face each other in the up-down direction.

6 Claims, 11 Drawing Sheets

CONNECTOR ASSEMBLY

CROSS REFERENCE TO RELATED APPLICATIONS

This application is based on and claims priority under 35 U.S.C. § 119 to Japanese Patent Application No. JP2022-020340 filed Feb. 14, 2022, the contents of which are incorporated herein in their entirety by reference.

BACKGROUND OF THE INVENTION

This invention relates to a connector assembly which is provided with a first connector and a second connector which are mateable with each other.

JP 2019-46670 A (Patent Document 1) discloses a connector assembly which is provided with a first connector and a second connector which are mateable with each other, for example.

Referring to FIG. 18, a connector assembly 90 of Patent Document 1 is provided with a first connector 92 and a second connector 94 which are mateable with each other in an up-down direction. The first connector 92 is a receptacle while the second connector 94 is a plug.

As shown in FIG. 18, the first connector 92 has first terminals 921 while the second connector 94 has second terminals 941. Each of the first terminals 921 has a spring portion 923 of a C-shape. The first terminal 921 further has a first contact point portion 925 and a first additional contact point portion 927. The first contact point portion 925 is supported by the spring portion 923 and located near a tip end of the spring portion 923. On the other hand, the first additional contact point portion 927 is located near a base end of the spring portion 923. Each of the second terminals 941 has a U-shaped portion 943. The second terminal 941 further has a second contact point portion 945 and a second additional contact point portion 947.

As understood from FIG. 18, when the first connector 92 and the second connector 94 are mated with each other, the spring portion 923 of the first terminal 921 is resiliently deformed and admits the U-shaped portion 943 of the second terminal 941. As a result, the first contact point portion 925 and the second contact point portion 945 are brought into contact with each other, and the first additional contact point portion 927 and the second additional contact point portion 947 are brought into contact with each other.

As shown in FIG. 18, the first terminal 921 further has a first lock portion 929. The first lock portion 929 is located near the first additional contact point portion 927 and distant from the first contact point portion 925. The second terminal 941 further has a second lock portion 949. The second lock portion 949 is located near the second additional contact point portion 947 and distant from the second contact point portion 945.

As understood from FIG. 18, in a state that the first connector 92 and the second connector 94 are mated with each other, upon moving the second connector 94 in a direction of separating the second connector 94 from the first connector 92, the second lock portion 949 is brought into abutment with the first lock portion 929. In order to separate the second connector 94 from the first connector 92, a force referred to as a removal force is necessary, wherein the removal force is larger than a holding force and enough to resiliently deform the spring portion 923 until the second lock portion 949 rides over the first lock portion 929. Additionally, the first lock portion 929 and the second lock portion 949 affect a force or an insertion force necessary to mate the first connector 92 and the second connector 94 with each other.

SUMMARY OF THE INVENTION

In the connector assembly 90 of Patent Document 1, the second terminal 941 cannot be resiliently deformed substantially. Accordingly, the insertion force and the removal force (or the holding force) in the connector assembly depend on a resilient force of the first terminal 92. Here, in the first terminal 921, the first lock portion 929 is located nearer to the base end of the spring portion 923 than to the tip end of the spring portion 923, so that the first lock portion 929 is hard to be moved. Therefore, if the holding force is increased by strengthening locking by the first lock portion 929, the insertion force is also increased. However, in the connector assembly, there is a demand to increase the holding force without increasing the insertion force.

It is an object of the present invention to provide a connector assembly which can increase a holding force without increasing an insertion force.

One aspect of the present invention provides a connector assembly which comprises a first connector and a second connector. The first connector is located downward of the second connector in an up-down direction. The first connector and the second connector are mateable with each other along the up-down direction. The first connector comprises a first terminal and a first holding member. The first holding member holds the first terminal. The first holding member has a regulating portion. The first terminal has a spring portion which is resiliently deformable, a first contact point portion, a first indented portion, a first lock portion and a regulated portion. The first contact point portion, the first indented portion, the first lock portion and the regulated portion are supported by the spring portion. The first lock portion is adjacent to the first indented portion. The first lock portion has a first intersection surface intersecting with the up-down direction. The regulated portion is located downward of the regulating portion in the up-down direction and faces the regulating portion. The second connector comprises a second terminal and a second holding member. The second holding member holds the second terminal. The second terminal has an insertion end portion, a second contact point portion, a second indented portion and a second lock portion. The insertion end portion is located at a lower end of the second terminal. The second lock portion has a second intersection surface intersecting with the up-down direction. The second indented portion is adjacent to the second lock portion. The second contact point portion is located upward of the second indented portion in the up-down direction. In a mated state that the first connector and the second connector are mated with each other, the second contact point portion is brought into contact with the first contact point portion. In the mated state, the first lock portion and the second lock portion are located between the first indented portion and the second indented portion in a width direction perpendicular to the up-down direction. In the mated state, the first lock portion and the second lock portion face each other in the up-down direction.

In the connector assembly according to the aspect of the present invention, the first contact point portion, the first lock portion and the regulated portion of the first terminal of the first connector are supported by the spring portion. The regulated portion is located downward of the regulating portion of the first holding member and faces the regulating portion. When the first connector and the second connector which are in the mated state are separated from each other, the second lock portion of the second terminal pushes up the first lock portion of the first terminal. At that time, the regulated portion of the first terminal tries to be moved, but the regulating portion regulates the movement of the first holding member. Accordingly, a holding force which is stronger than a holding force depending on a resilient force of the spring portion is obtained. On the other hand, an insertion force is a force depending on the resilient force of the spring portion. Thus, the connector assembly according to the aspect of the present invention can increase the holding force without increasing the insertion force.

An appreciation of the objectives of the present invention and a more complete understanding of its structure may be had by studying the following description of the preferred embodiment and by referring to the accompanying drawings.

The first connector and the second connector are mated with each other and in a mated state.

Figure 1:
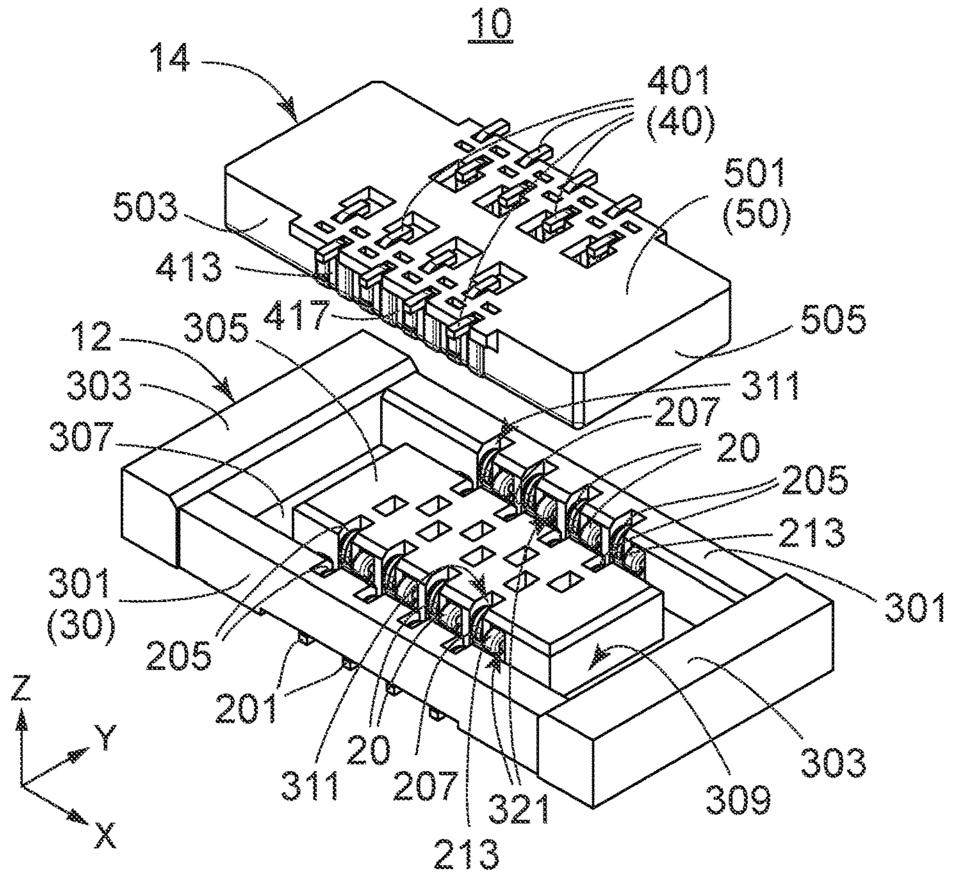
FIG. 1 is a perspective view showing a connector assembly accordingly to an embodiment of the present invention. A first connector and a second connector are separated from each other and in a separated state.
Figure 3:
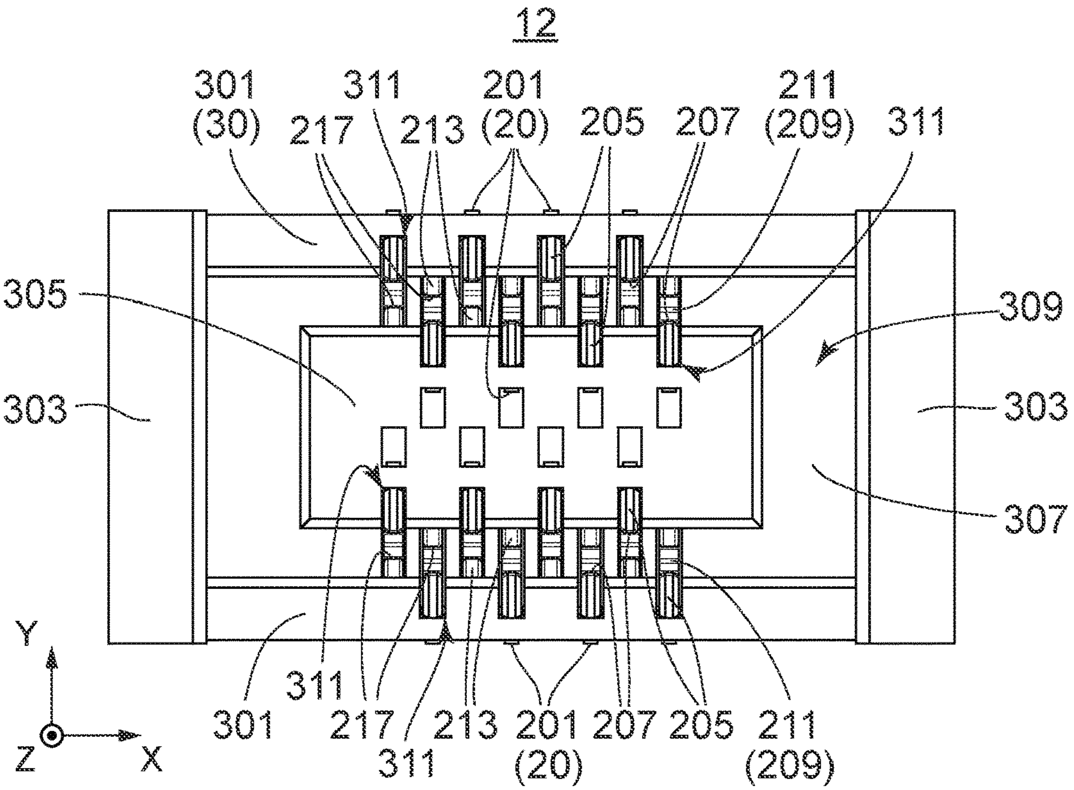

FIG. 3 is a plane view showing the first connector included in the connector assembly of FIG. 1.

Figure 4:
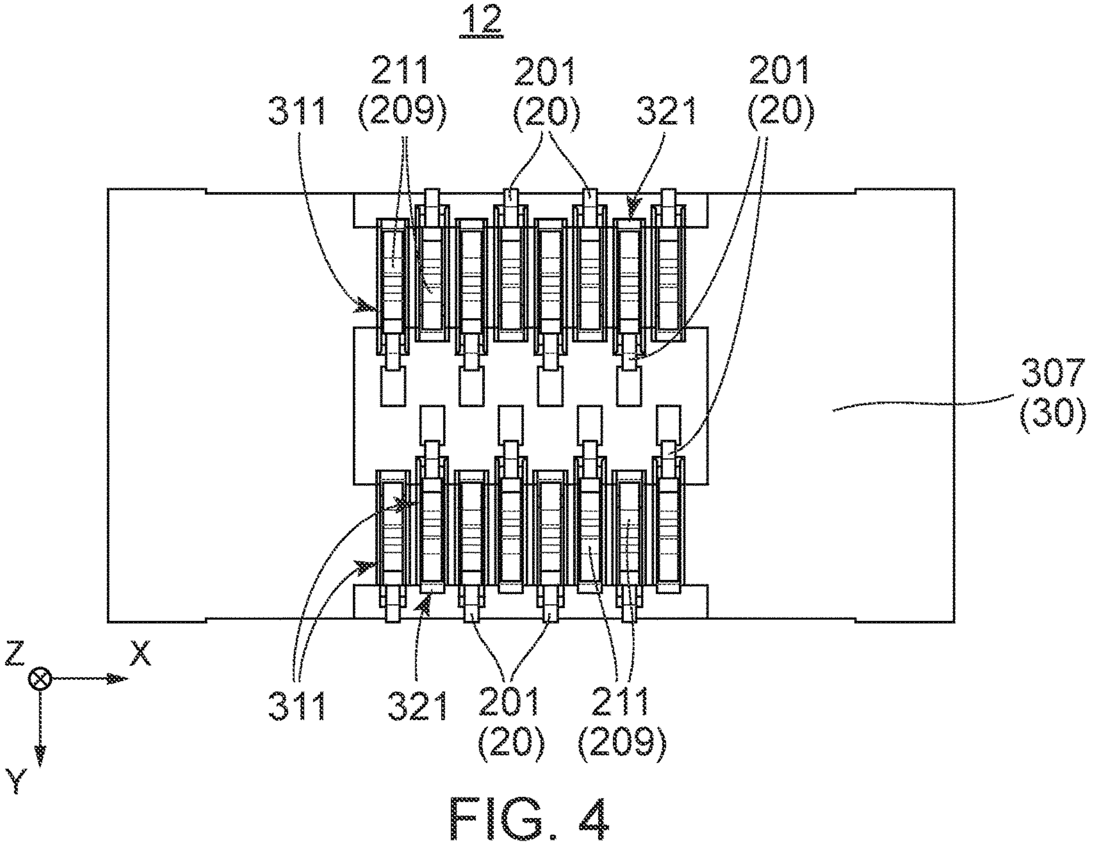

FIG. 4 is a bottom view showing the first connector of FIG. 3.

Figure 5:
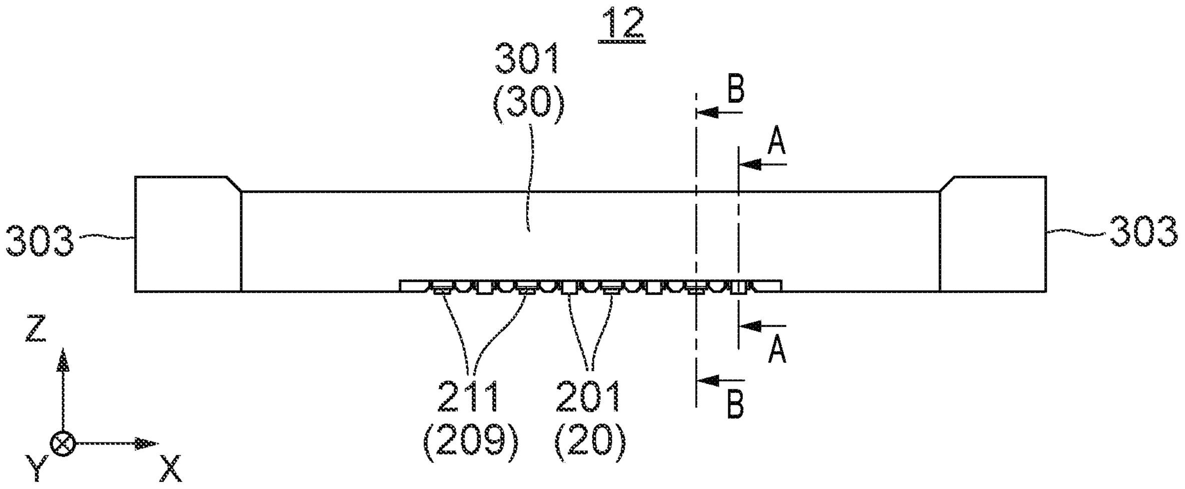

FIG. 5 is a side view showing the first connector of FIG. 3.

Figure 6:
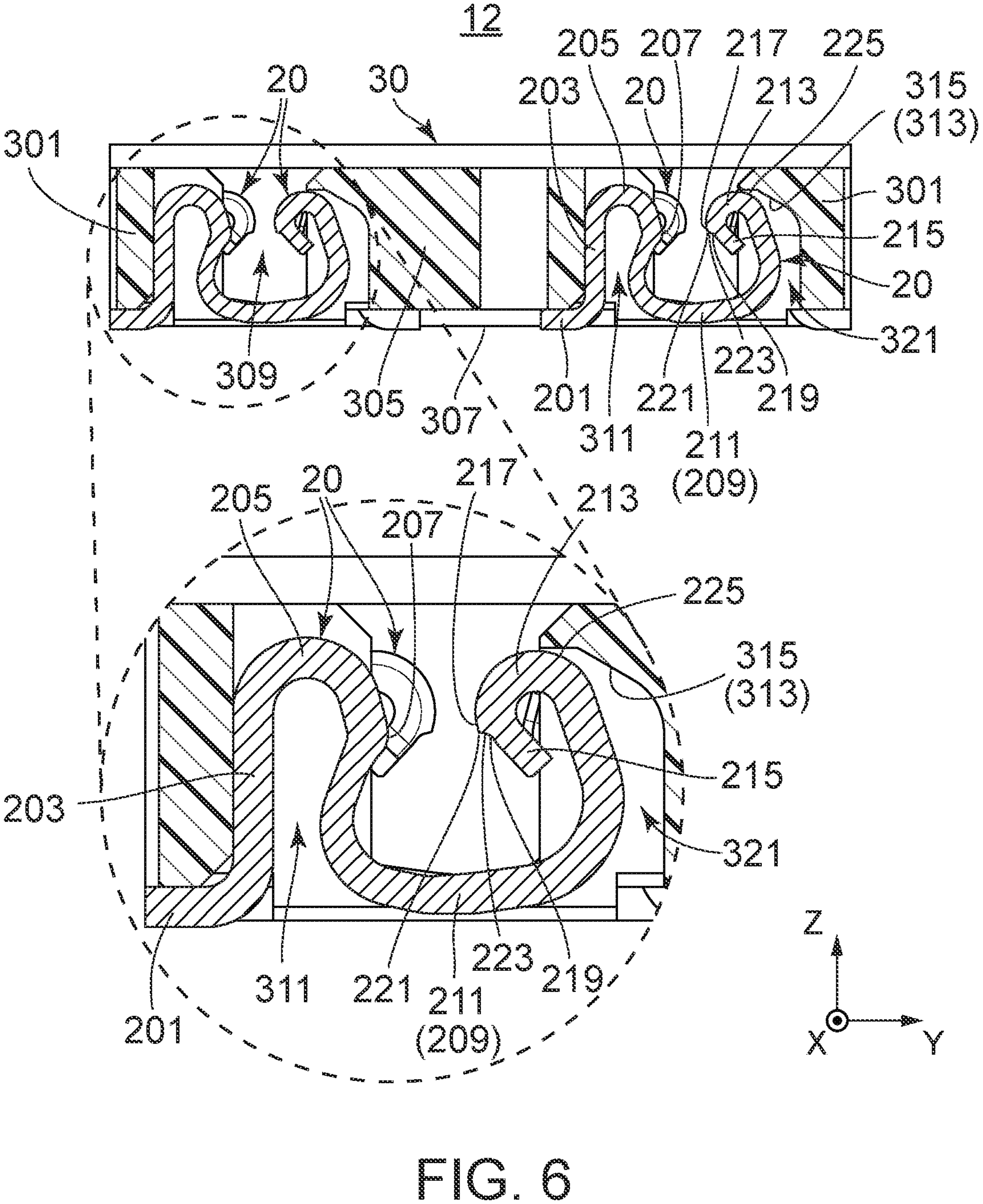

FIG. 6 is a cross-sectional view showing the first connector of FIG. 5, taken along line A-A.

Figure 7:
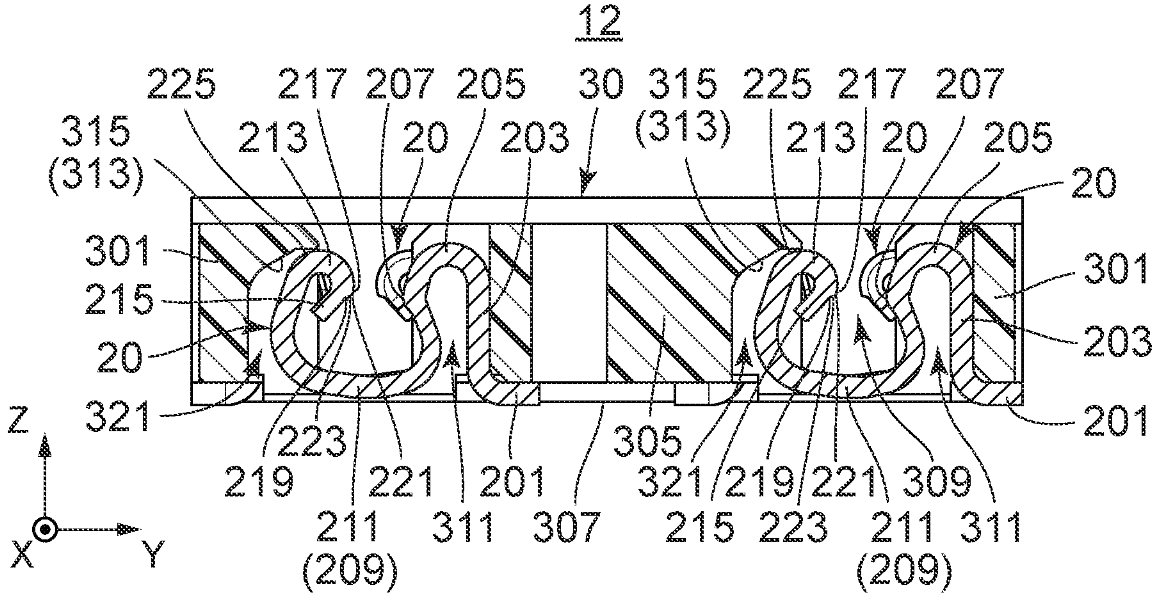

FIG. 7 is a cross-sectional view showing the first connector of FIG. 5, taken along line B-B.

Figure 8:
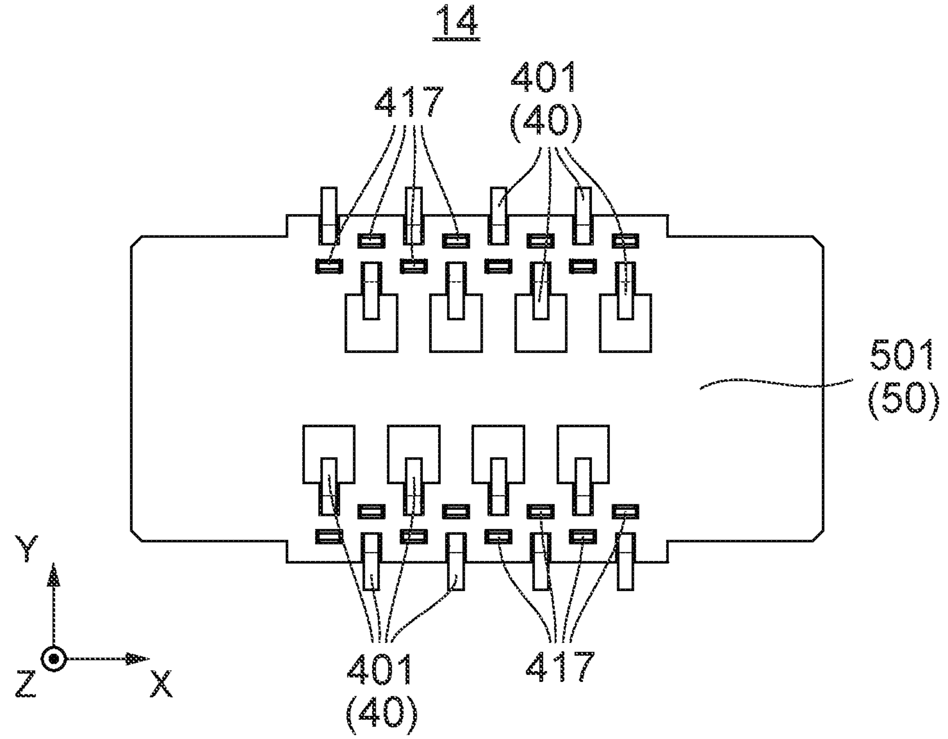

FIG. 8 is a plane view showing the second connector included in the connector assembly of FIG. 1.

Figure 9:
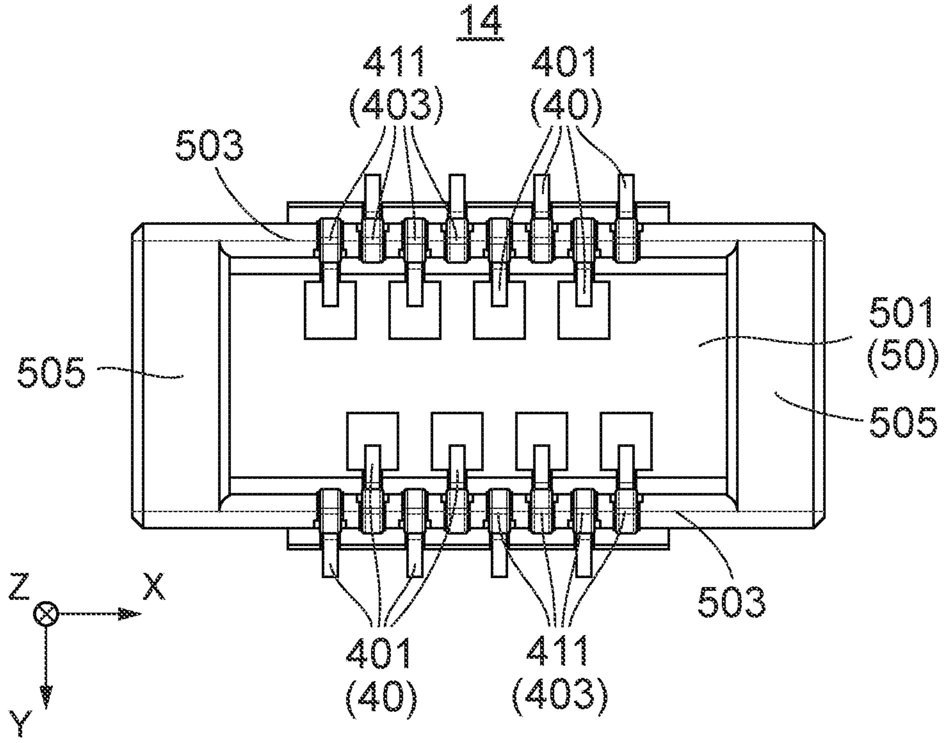

FIG. 9 is a bottom view showing the second connector of FIG. 8.

Figure 10:
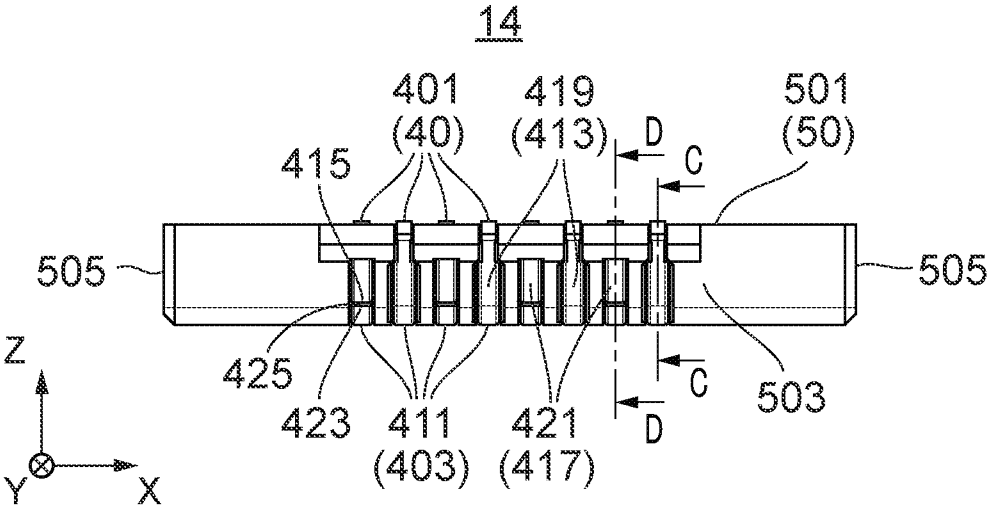

FIG. 10 is a side view showing the second connector of FIG. 8.

Figure 11:
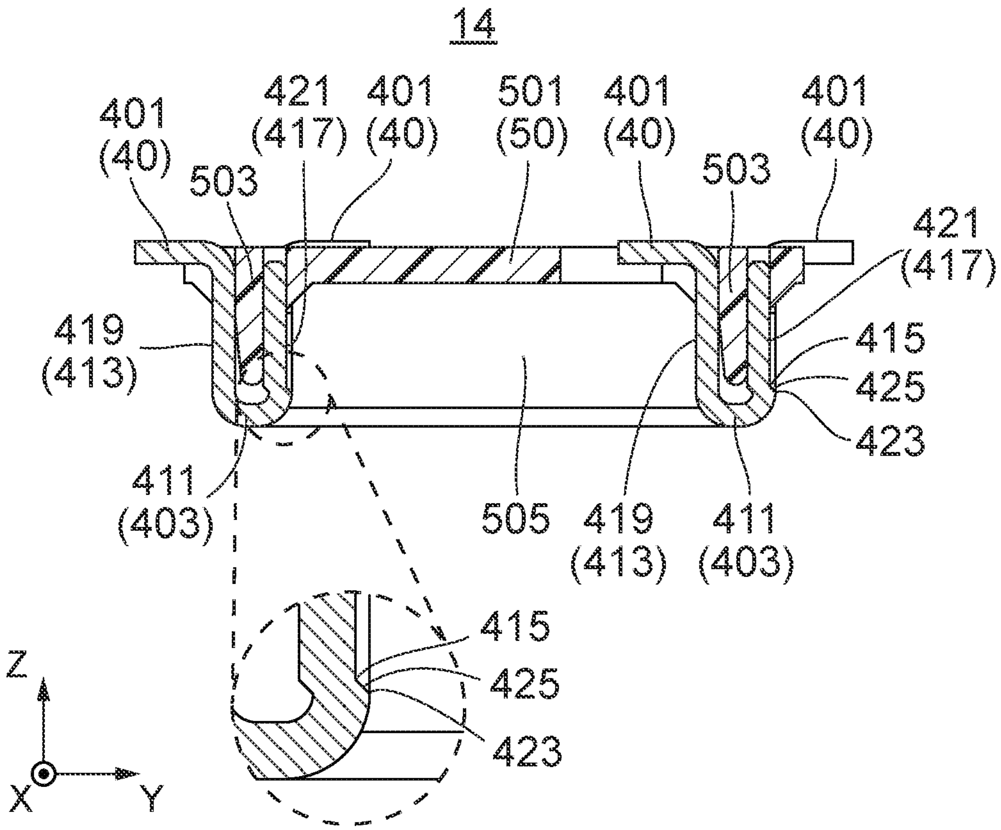

FIG. 11 is a cross-sectional view showing the second connector of FIG. 10, taken along line C-C.

Figure 12:
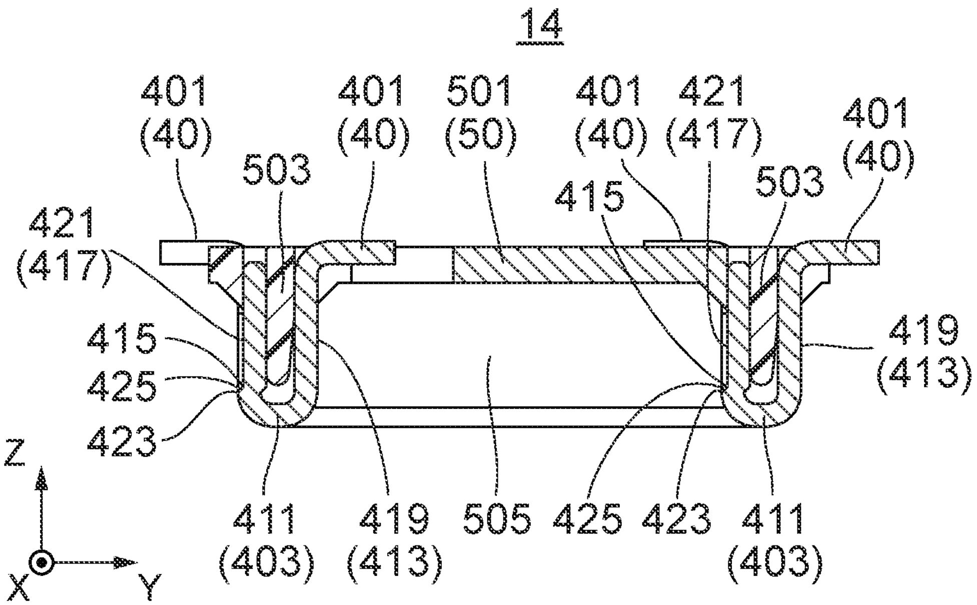

FIG. 12 is a cross-sectional view showing the second connector of FIG. 10, taken along line D-D.

Figure 13:
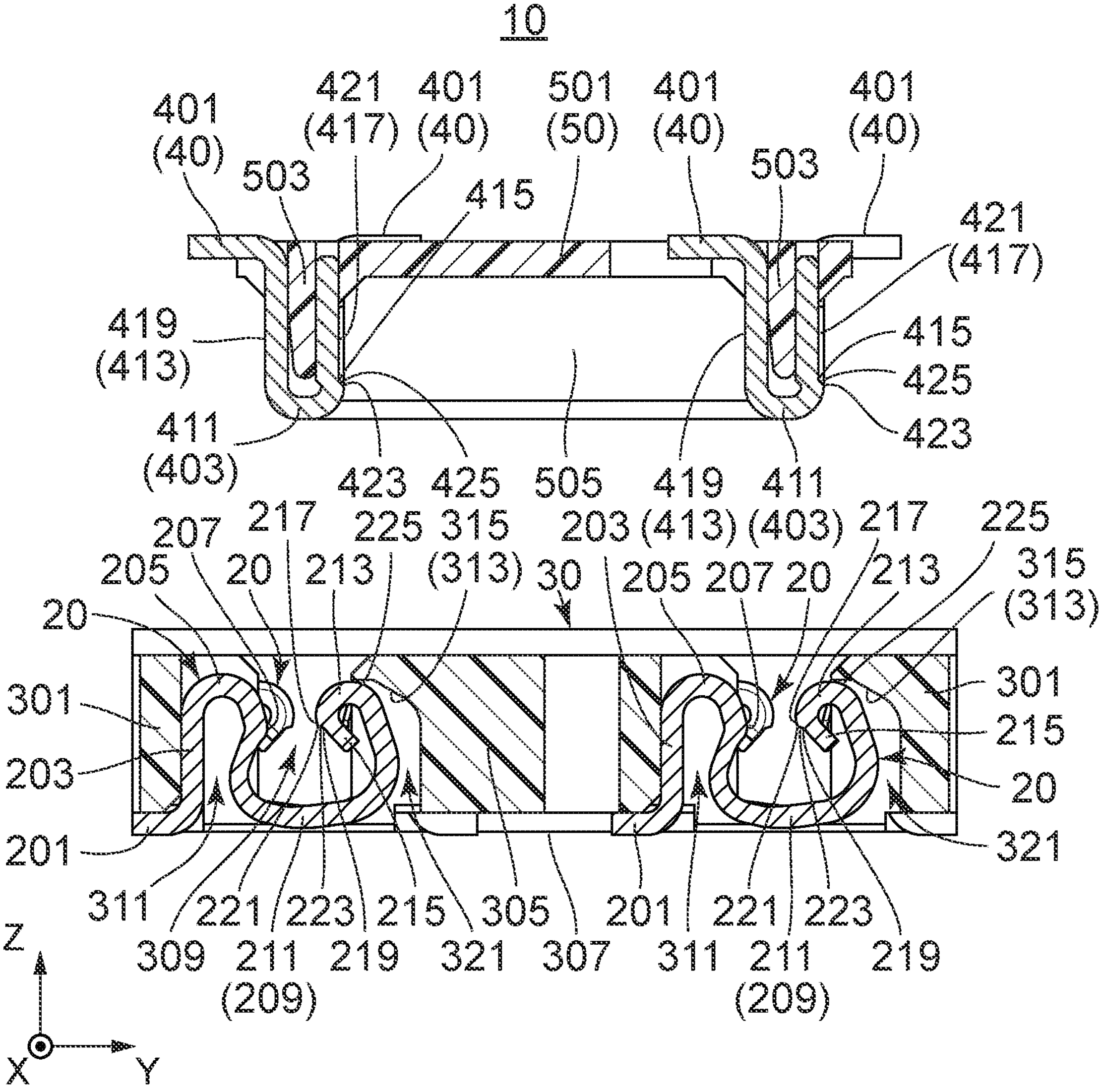

FIG. 13 is a cross-sectional view showing the connector assembly of FIG. 1.

Figure 2:
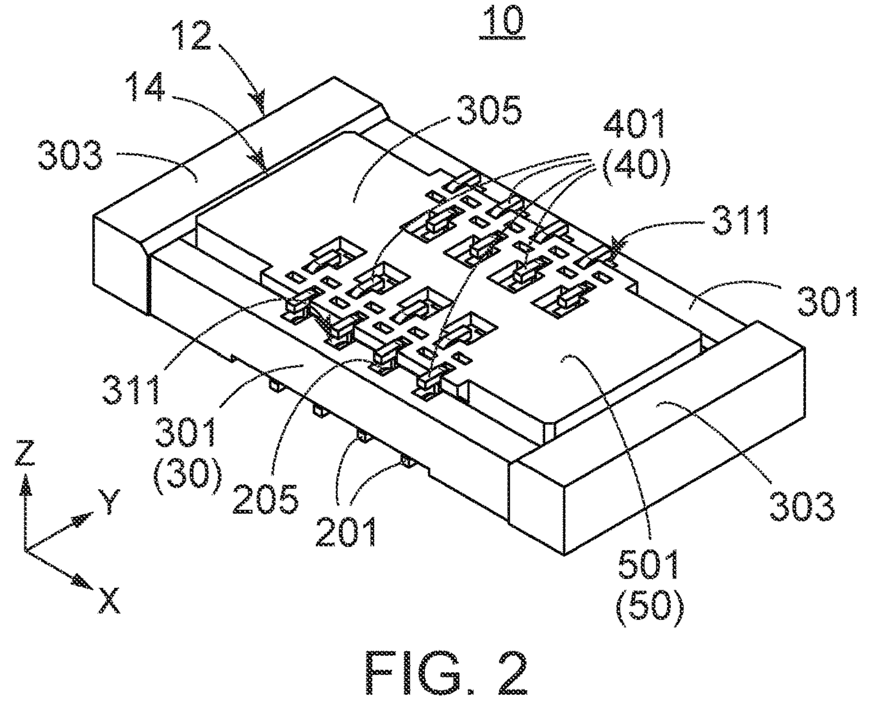
FIG. 2 is another perspective view showing the connector assembly of FIG. 1.
Figure 14:
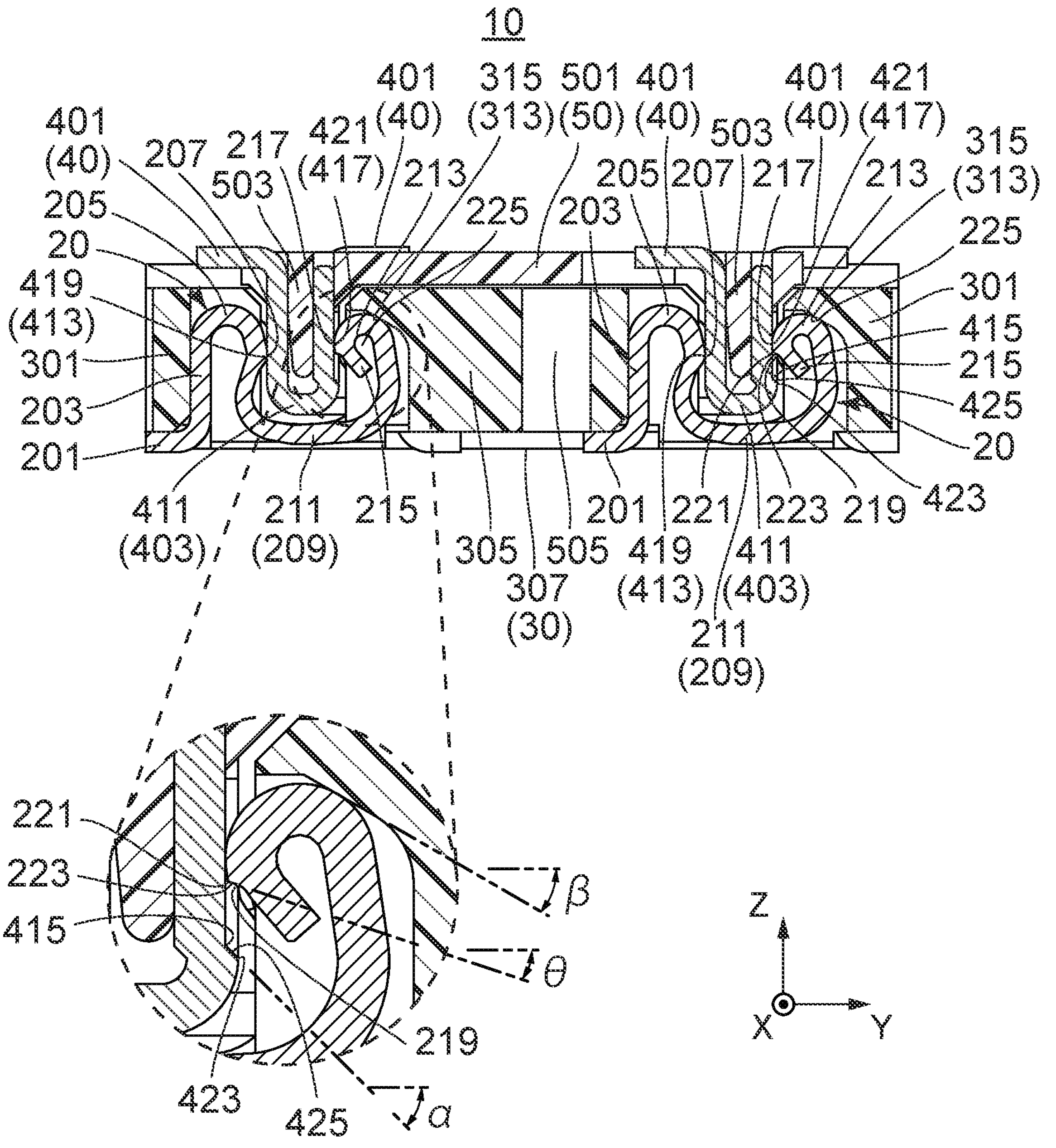

FIG. 14 is a cross-sectional view showing the connector assembly of FIG. 2.

Figure 15:
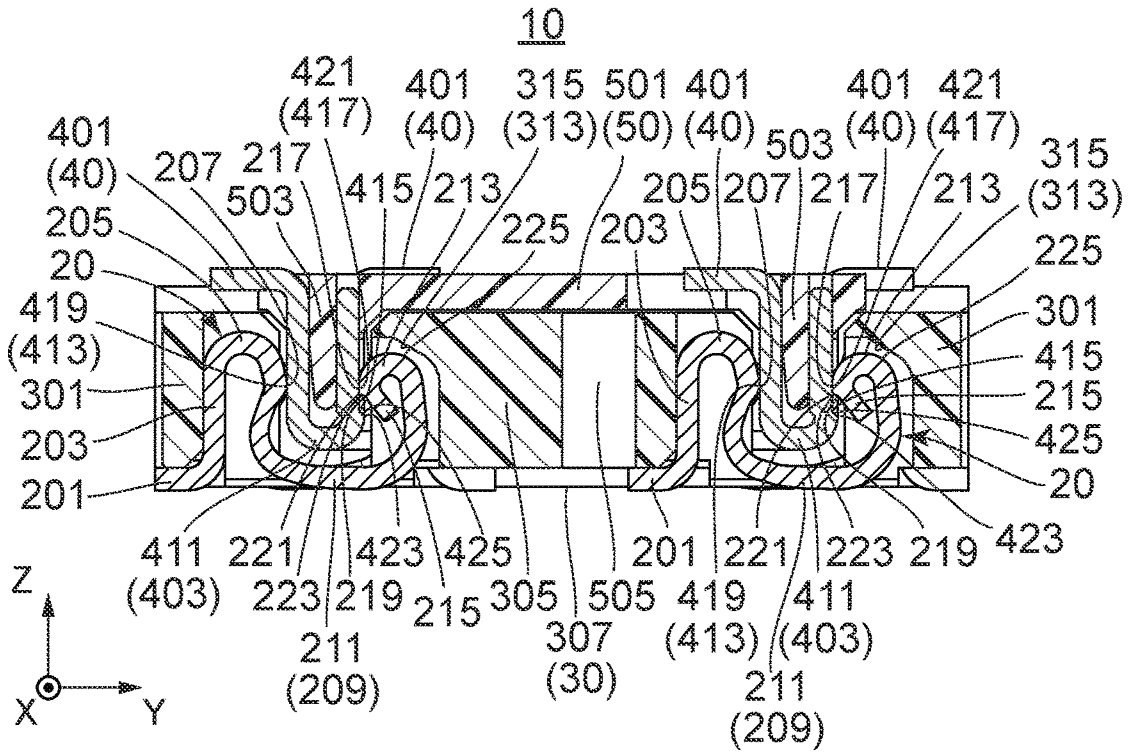

FIG. 15 is a cross-sectional view showing the connector assembly of FIG. 14. The first terminal is in a state of being deformed by receiving a downward force from the second terminal.

Figure 16:
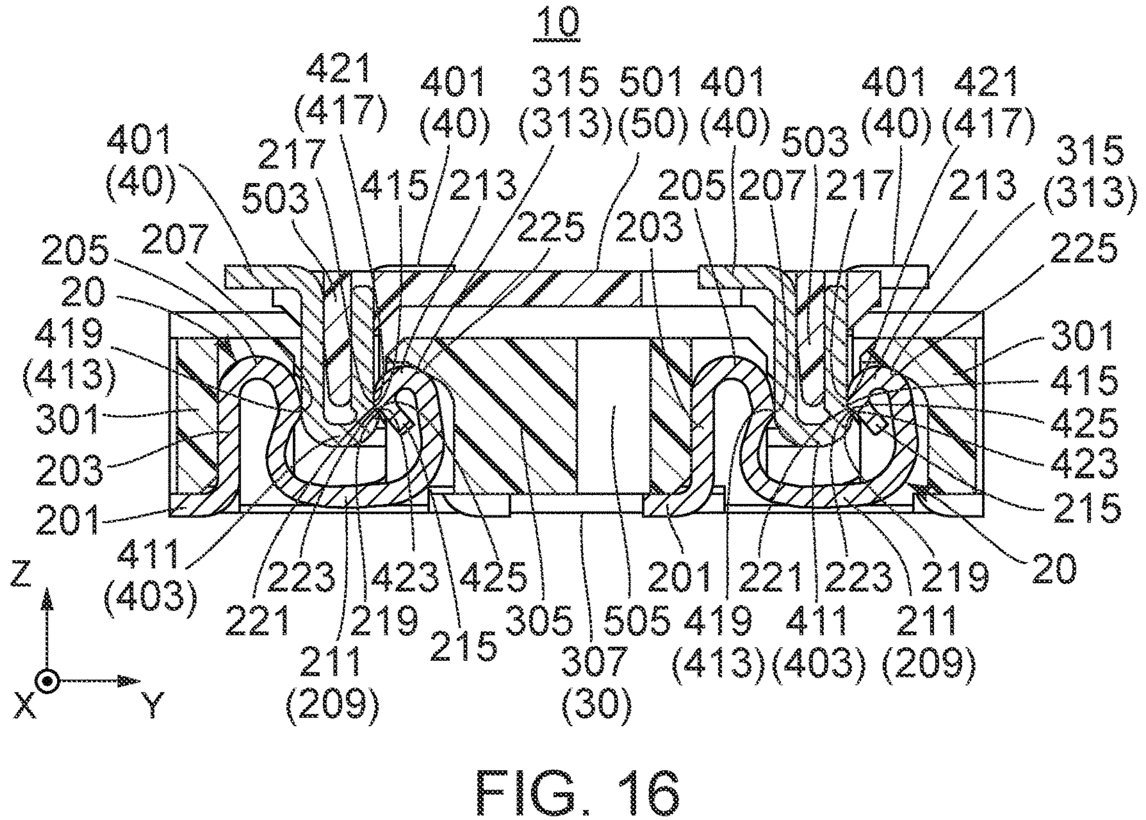

FIG. 16 is another cross-sectional view showing the connector assembly of FIG. 14. The first connector and the second connector are in a halfway state shifting from the mated state to the separated state. A first lock portion and a second lock portion are brought into abutment with each other.

Figure 17:
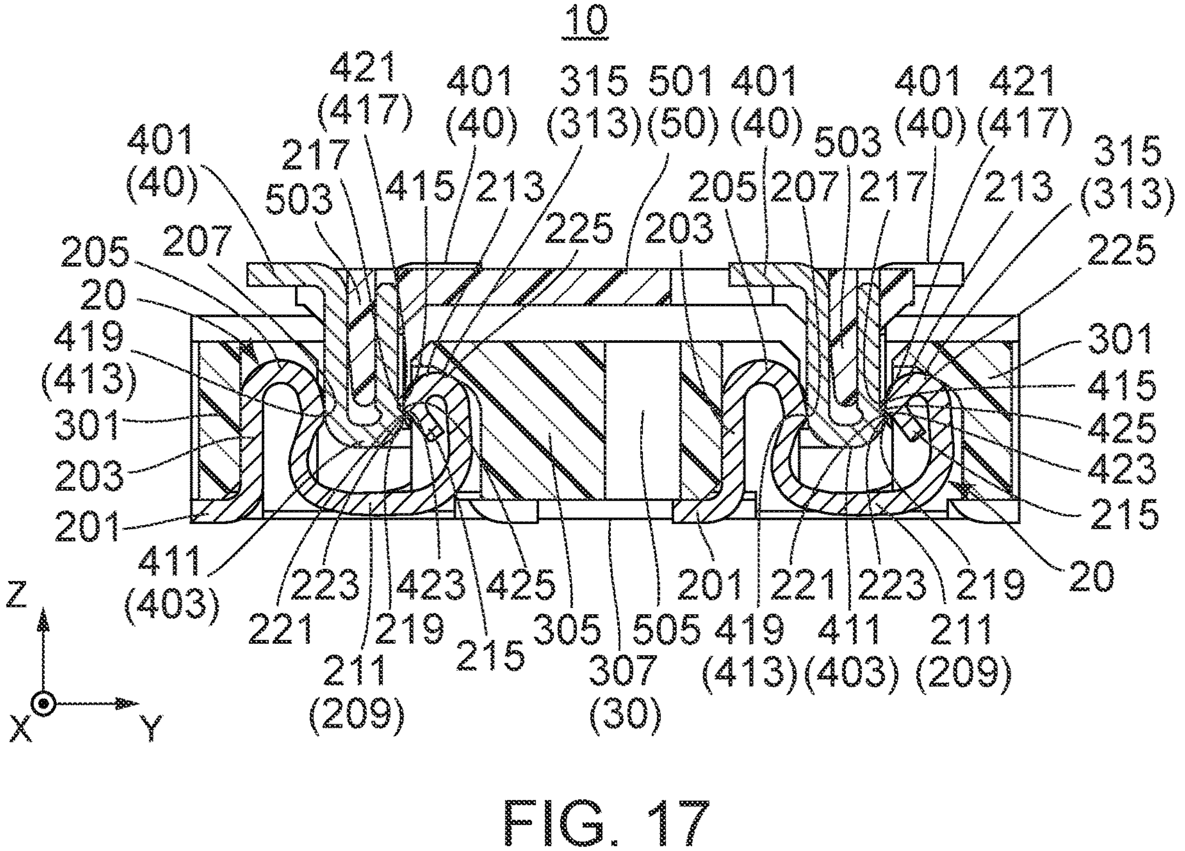

FIG. 17 is another cross-sectional view showing the connector assembly of FIG. 16. The first connector and the second connector are in another halfway state shifting from the mated state to the separated state. The second lock portion rides over the first lock portion.

Figure 18:
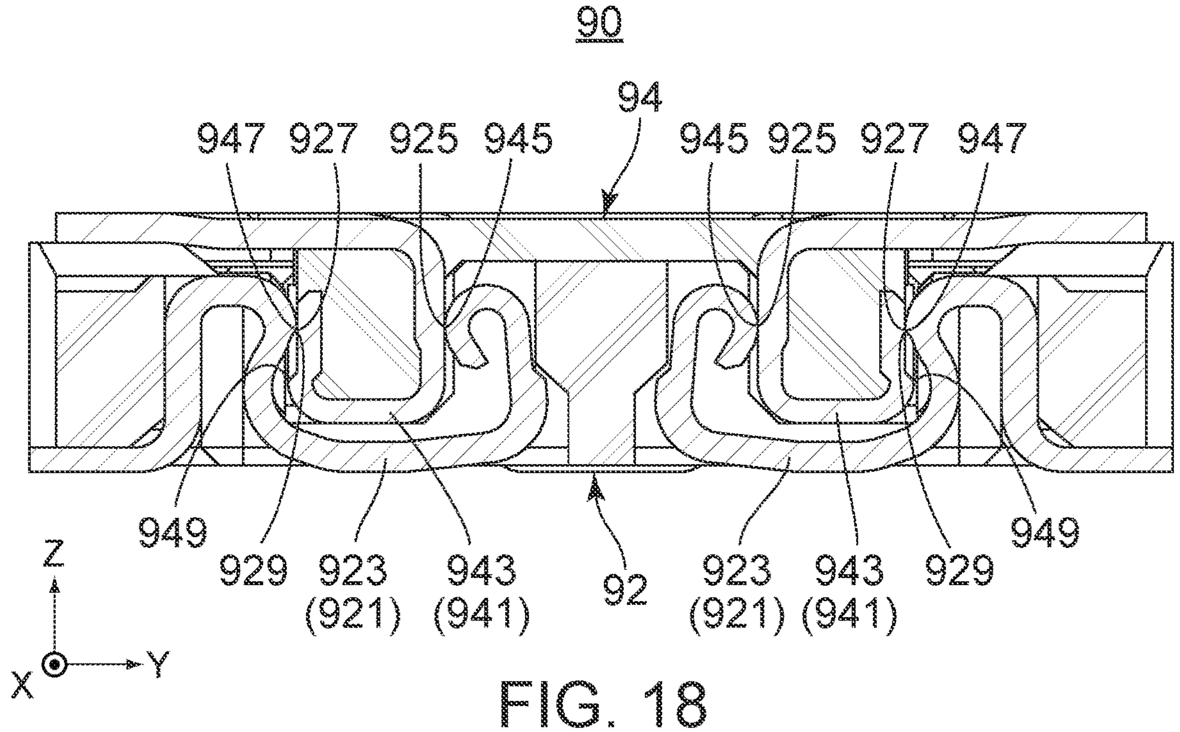
FIG. 18 PRIOR ART

FIG. 18 is a cross-sectional view showing a connector assembly disclosed in Patent Document 1. A first connector and a second connector are mated with each other and in a mated state.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIGS. 1 and 2, a connector assembly 10 according to an embodiment of the present invention is provided with a first connector 12 and a second connector 14. In the present embodiment, the first connector 12 and the second connector 14 are mateable with each other along an up-down direction. In a mated state or a mateable state, the first connector 12 is located downward of the second connector 14 in the up-down direction. In the present embodiment, the first connector 12 is a receptacle while the second connector 14 is a plug. Moreover, in the present embodiment, the “up-down direction” is a Z-direction. A positive Z-direction is directed upward while a negative Z-direction is directed downward.

As shown in FIGS. 3 and 4, the first connector 12 is provided with a plurality of first terminals 20 and a first holding member 30. Each of the first terminals 20 is formed by punching and bending a sheet metal, for example. The first holding member 30 is made of insulating resin, for example. The first holding member 30 holds the first terminals 20. In the present embodiment, the first terminals 20 are press-fit into and held by the first holding member 30. However, the present invention is not limited thereto. The first terminals 20 may be held by the first holding member by using any method, for example, insert molding.

As shown in FIGS. 3 and 4, the first terminals 20 are sixteen in number in the present embodiment. The first terminals 20 are arranged in two rows. However, the present invention is not limited thereto. The number of the first terminal(s) 20 should be at least one. Moreover, the first terminals 20 may be arranged in one or three or more rows.

As understood from FIGS. 5 to 7, in the present embodiment, two of the first terminals 20, which are adjacent to each other in a width direction perpendicular to the up-down direction, are arranged so that they are directed in directions same as each other. On the other hand, two of the first terminals 20, which are adjacent to each other in a front-rear direction perpendicular to both the up-down direction and the lateral direction, are arranged so that they are directed in directions opposite to each other. However, the present invention is not limited thereto. The two first terminals 20 adjacent to each other in the width direction may be directed in directions opposite to each other. Moreover, the two first terminals 20 adjacent to each other in the front-rear direction may be directed in directions same as each other. In the present embodiment, the width direction is a Y-direction, and the front-rear direction is an X-direction.

As shown in FIG. 6, each of the first terminals 20 has a fixed portion 201, a held portion 203, a coupling portion

205, a first additional contact point portion 207, a spring portion 209, a first contact point portion 217, a first indented portion 219, a first lock portion 221 and a regulated portion 225. The fixed portion 201 extends in the width direction. The fixed portion 201 is fixed to an object (not shown), such as a substrate, when the first connector 12 is mounted on the object. The held portion 203 extends upward from an end of the fixed portion 201. The held portion 203 is a part of the first terminal 20 which is held by the first holding member 30. The coupling portion 205 extends from an end of the held portion 203 so as to draw an arc. The coupling portion 205 couples the held portion 203 and the spring portion 209 with each other. The spring portion 209 extends from an end of the coupling portion 205 so as to draw a C-shape and then draw an arc and further extends diagonally downward.

As shown in FIG. 6, the first additional contact point portion 207 is located between the held portion 203 and the spring portion 209. In other words, the first additional contact point portion 207 is provided at a border between the held portion 203 and the spring portion 209. However, in the present invention, the first additional contact point portion 207 is not essential. Nevertheless, the first additional contact point portion 207 is effective in improving reliability of electrical connection between the first terminal 20 and a second terminal 40 (described later) corresponding thereto.

As shown in FIG. 6, the spring portion 209 has a spring main portion 211, an arc-shaped portion 213 and a tip portion 215. The first contact point portion 217, the first indented portion 219, the first lock portion 221 and the regulated portion 225 are supported by the spring portion 209. In detail, the first contact point portion 217 and the regulated portion 225 are provided to an outer peripheral surface of the arc-shaped portion 213. The first contact point portion 217 is closer to the tip portion 215 than the regulated portion 225 is. The first contact point portion 217 faces the first additional contact point portion 207 in the width direction. In the up-down direction, the regulated portion 225 is located upward of the first contact point portion 217. The first indented portion 219 is located between the arc-shaped portion 213 and the tip portion 215. The first indented portion 219 is indented upward in the up-down direction and indented outward in the width direction. The first lock portion 221 is located between the arc-shaped portion 213 and the first indented portion 219 and adjacent to the first indented portion 219.

As understood from FIGS. 13 and 14, the spring portion 209 is resiliently deformable. Due to resilient deformation of the spring portion 209, the first contact point portion 217, the first indented portion 219, the first lock portion 221 and the regulated portion 225 which are supported by the spring portion 209 are movable in the width direction and the up-down direction.

As shown in FIG. 1, the first holding member 30 has a pair of long walls 301, a pair of short walls 303, an island portion 305 and a bottom portion 307. Around the island portion 305, a connector receiving portion 309 is formed for receiving the second connector 14 in part.

As understood from FIGS. 1, 6 and 7, each of the long walls 301 is provided with first accommodation portions 311 and second accommodation portions 321 which are alternately arranged along the front-rear direction. To the island portion 305, second accommodation portions 321 and first accommodation portions 311 are provided so that the second accommodation portions 321 and the first accommodation portions 311 provided to the island portion 305 correspond to the first accommodation portions 311 and the second accommodation portions 321 provided to the long walls 301, respectively.

As understood from FIGS. 6 and 7, each of the first accommodation portions 311 accommodates at least the held portion 203 and a part of the coupling portion 205. Each of the second accommodation portions 321 accommodates at least a part of the arc-shaped portion 213 of the spring portion 209.

As shown in FIGS. 6 and 7, the first holding member 30 has regulating portions 313 each of which defines a part of the second accommodation portion 321. Each of the regulating portions 313 has an inclined surface 315 obliquely intersecting with both the up-down direction and the width direction. The regulating portion 313 is located upward of the arc-shaped portion 213 at least in part in the up-down direction. In addition, in the width direction, a position of the inclined surface 315 of the regulating portion 313 overlaps with the arc-shaped portion 213. Accordingly, the regulating portion 313 is apart from and faces the regulated portion 225 of the first terminal 20. In other words, the regulated portion 225 of the first terminal 20 is located downward of the regulating portion 313 in the up-down direction and faces the regulating portion 313.

Referring to FIGS. 8 and 9, the second connector 14 is provided with a plurality of second terminals 40 and a second holding member 50. The second holding member 50 holds the second terminals 40. Each of the second terminals 40 is formed by punching and bending a sheet metal, for example. The second holding member 50 is made of insulating resin, for example.

As shown in FIGS. 8 and 9, the second holding member 50 has an upper plate 501, a pair of long walls 503 and a pair of short walls 505. In the present embodiment, the second terminals 40 are press-fit into accommodate channels formed in the long walls 503 and held by the second holding member 50. However, the present invention is not limited thereto. The second terminals 40 may be held by the second holding member 50 by using any method, for example, insert molding.

As understood from FIGS. 10 to 12, the second terminals 40 are arranged so that the second terminals 40 correspond to the first terminals 20 of the first connector 12, respectively. In detail, in the present embodiment, two of the second terminals 40, which are adjacent to each other in the width direction, are arranged so that they are directed in directions same as each other. On the other hand, two of the second terminals 40, which are adjacent to each other in the front-rear direction, are arranged so that they are directed in directions opposite to each other. However, the present invention is not limited thereto. The number and an arrangement of the second terminals 40 should be correspond to the number and an arrangement of the first terminals 20.

As shown in FIG. 11, each of the second terminals 40 has a fixed portion 401 and a U-shaped portion 403. The U-shaped portion 403 has an insertion end portion 411, a first linear portion (an additional linear portion) 413, a second indented portion 415 and a second linear portion (a linear portion) 417. The first linear portion 413 extends upward from an end of the insertion end portion 411 and is connected to one of ends of the fixed portion 401. The fixed portion 401 extends in the width direction. The second indented portion 415 is located between a remaining one of the ends of the insertion end portion 411 and the second linear portion 417. The second indented portion 415 is indented toward the first linear portion 413 in the width direction. The second linear portion 417 extends upward from the second indented portion 415. The insertion end portion 411 is located at a lower end of the second terminal 40.

As shown in FIG. 11, the U-shaped portion 403 is provided with a second additional contact point portion 419, a second contact point portion 421 and a second lock portion 423. In other words, the second terminal 40 has the second additional contact point portion 419, the second contact point portion 421 and the second lock portion 423 in addition to the insertion end portion 411 and the second indented portion 415. The second additional contact point portion 419 is provided on the first linear portion 413 and directed outward in the width direction. The second contact point portion 421 is provided on the second linear portion 417 and located upward of the second indented portion 415. The second contact point portion 421 is directed outward in the width direction. The second additional contact point portion 419 and the second contact point portion 421 are directed in directions opposite to each other. The second lock portion 423 is located between the second indented portion 415 and the insertion end portion 411, and the second indented portion 415 is adjacent to the second lock portion 423.

As understood from FIGS. 13 and 14, when the first connector 12 and the second connector 14 are mated with each other, the second terminals 40 are received by the connector receiving portion 309 of the first connector 12. Then, each of the second terminals 40 is inserted into between the first contact point portion 217 and the first additional contact point portion 207 of the first terminal 20 corresponding thereto. In the width direction, a distance size between the first contact point portion 217 and the additional contact point portion 207 of the first terminal 20 is smaller than a width size of the second connector 14 which is defined by the linear portion 417 and the additional linear portion 413 of the second terminal 40. The spring portion 209 of the first terminal 20 is resiliently deformed by insertion of the second terminal 40, so that the second terminal 40 is received between the first contact point portion 217 and the first additional contact point portion 207.

As understood from FIGS. 14 and 15, the spring portion 209 is resiliently deformed and allows the second lock portion 423 to be moved downward of the first lock portion 221 in the up-down direction. The first lock portion 221 is provided near not the first additional contact point portion 207 but the first contact point portion 217, so that the insertion force of the connector assembly 10 can be easily reduced. In other words, the first lock portion 221 is provided nearer to a tip end of the spring portion 209 than to a base end of the spring portion 209, so that the insertion force of the connector assembly 10 can be easily reduced.

As shown in FIGS. 14 and 15, in the mated state, the first lock portion 221 and the second lock portion 423 are located between the first indented portion 219 and the second indented portion 415 in the width direction. Moreover, in the mated state, the first lock portion 221 and the second lock portion 423 face each other in the up-down direction. The first lock portion 221 and the second lock portion 423 correspond to each other, so that the holding force is generated in the connector assembly 10 of the present embodiment.

As shown in FIGS. 14 and 15, in the mated state that the first connector 12 and the second connector 14 are mated with each other, the first contact point portion 217 is brought into contact with the second contact point portion 421, and the first additional contact point portion 207 is brought into contact with the second additional contact point portion 419. Providing two contact points to each of the first terminals 20 can improve connection reliability in the connector assembly 10 of the present embodiment.

As understood from FIGS. 15 and 16, upon moving the second connector 14 in the mated state upward with respect to the first connector 12, the second lock portion 423 is brought into abutment with the first lock portion 221. Upon trying to further move the second connector 14 upward, the second lock portion 423 pushes the first lock portion 221 upward. As a result, the arc-shaped portion 213 is moved upward, and the regulated portion 225 is brought into abutment with the regulating portion 313. In other words, the regulating portions 313 regulates upward movement of the regulated portion 225. Here, the regulating portion 313 has the inclined surface 315 and regulates movement of the arc-shaped portion 213 also in the width direction. However, the regulating portions 313 does not prevent the arc-shaped portion 213 from being moved in the width direction.

As understood from FIGS. 16 and 17, by taking a state that the regulating portion 313 regulates the upward movement of the regulated portion 225, followed by moving the second connector 14 upward with respect to the first connector 12, the second lock portion 423 pushes the first lock portion 221 in a direction of moving the first lock portion 221 away from the first additional contact point portion 207. As a result, the second lock portion 423 can be moved upward of the first lock portion 221 in the up-down direction. Thus, the second connector 14 can be separated from the first connector 12.

As understood from FIGS. 14 to 17, when the first connector 12 and the second connector 14 are mated with each other, the regulating portion 313 does not regulate downward movement of the arc-shaped portion 213. On the other hand, when the first connector 12 and the second connector 14 are separated from each other, the regulating portion 313 regulates upward movement and width direction movement of the arc-shaped portion 213. As a result, the connector assembly 10 of the present embodiment can have the holding force larger than the insertion force. That is, without increasing the insertion force of the second connector 14 with respect to the first connector 12, the holding force of the first connector 12 with respect to the second connector 14 can be increased.

In order to appropriately set the insertion force and the holding force of the connector assembly 10, the first lock portion 221 has a first intersection surface 223 intersecting with the up-down direction, as shown in FIG. 6. Moreover, as shown in FIG. 11, the second lock portion 423 has a second intersection surface 425 intersecting with the up-down direction. Here, each of the first intersection surface 223 and the second intersection surface 425 may be a flat surface or a curved surface. Nevertheless, it is preferable that at least one of the first intersection surface 223 and the second intersection surface 425 is a flat surface. This is because a rapid reduction of the holding force can be avoided when the first connector 12 and the second connector 14 are separated from each other. In the present embodiment, both the first intersection surface 223 and the second intersection surface 425 are flat surfaces.

In addition, in order to appropriately set the insertion force and the holding force of the connector assembly 10, a relation between the first lock portion 221 and the second lock portion 423 and a relation between the regulated portion 225 and the regulating portion 313 are set as follows. First, a state shown in FIG. 16 is assumed. In that state, the first lock portion 221 is brought into contact with the second lock portion 423, and the regulated portion 225 is brought into contact with the regulating portions 313. In this state, an angle (first angle) formed by the width direction and a tangential line at a contact position between the first lock portion 221 and the second lock portion 423 and an angle (second angle) formed by the width direction and a tangential line at a contact position between the regulated portion 225 and the regulating portion 313 are set so that the former (first angle) is larger than the latter (second angle). Particularly, this can be made as follows in the present embodiment because both the first intersection surface 223 and the second intersection surface 425 are the flat surfaces. As shown in FIG. 14, it is assumed that an angle formed by the width direction and the second intersection surface 425 of the second lock portion 423 is represented by $\alpha$. Moreover, it is assumed that an angle formed by the width direction and the tangential line at the contact position between the regulated portion 225 and the regulating portion 313 is represented by $\beta$. When an angle $\theta$ formed by the width direction and the first intersection surface 223 of the first lock portion 221 is equal to or smaller than the angle $\alpha(\theta \leq \alpha)$, the angle $\beta$ should be set to be smaller than the angle $\alpha(\alpha > \beta)$ under a frictionless condition. Increasing the angle $\beta$ can increase the holding force. However, friction cannot be disregarded in fact, so that displacement of the spring portion 209 becomes difficult or impossible due to the friction if a certain difference between the angle $\alpha$ and the angle $\beta$ are not set. Accordingly, in consideration of the friction, setting the angle $\beta$ to be smaller than the angle $\alpha$ allows the holding force of the connector assembly 10 to be appropriately set. In contrast to this, in a case where at least one of the first intersection surface 223 and the second intersection surface 425 is not a flat surface, it is necessary to specify the aforementioned first angle and the aforementioned second angle under a predetermined condition and to set the first angle and the second angle so that the first angle is larger than the second angle, wherein the predetermined condition is that the first lock portion 221 is brought into contact with the second lock portion 423 and that the regulated portion 225 is brought into contact with the regulating portion 313. Accordingly, it is preferable for design that both the first intersection surface 223 and the second intersection surface 425 are flat surfaces.

Although the specific explanation about the present invention is made above with reference to the embodiments, the present invention is not limited thereto but susceptible of various modifications and alternative forms without departing from the spirit of the invention. For example, although the regulated portion 225 is provided to the arc-shaped portion 213 of the spring portion 209 in the aforementioned embodiment, the regulated portion 225 may be provided to the spring main portion 211. Nevertheless, providing the regulated portion 225 to the arc-shaped portion 213 makes it easier to reduce a size of the first connector 12 in the width direction in comparison with providing the regulated portion 225 to the spring main portion 211.

Although a surface of the second linear portion 417 on which the second contact point portion 421 is provided is flat from the second indented portion 415 to the tip of the second linear portion 417 in the aforementioned embodiment, it should have a flat part having a predetermined length in the up-down direction. Nevertheless, when the surface of the second linear portion 417 is flat to the tip, contact reliability is higher because a stable contact pressure can be obtained.

The connector assembly of the present invention may further have a first additional lock portion (not shown) and a second additional lock portion (not shown) which correspond to the first lock portion 929 (see FIG. 18) and the second lock portion 949 (see FIG. 18) of the connector assembly 90 (see FIG. 18) disclosed in Patent Document 1. In that case, the connector assembly of the present invention can increase the holding force without increasing the insertion force in comparison with the connector assembly 90 of Patent Document 1. Additionally, the connector assembly 10 according to the aforementioned embodiment does not have the first additional lock portion and the second additional lock portion, so that it can reduce the insertion force in comparison with the connector assembly 90 of Patent Document 1 and secure necessary holding force.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector assembly comprising a first connector and a second connector, wherein:

the first connector is located downward of the second connector in an up-down direction;

the first connector and the second connector are mateable with each other along the up-down direction;

the first connector comprises a first terminal and a first holding member;

the first holding member holds the first terminal;

the first holding member has a regulating portion;

the first terminal has a spring portion which is resiliently deformable, a first contact point portion, a first indented portion, a first lock portion, and a regulated portion;

the first contact point portion, the first indented portion, the first lock portion, and the regulated portion are supported by the spring portion;

the first lock portion is adjacent to the first indented portion;

the first lock portion is closer to the contact point portion than the first indented portion is;

a first intersection surface intersecting with the up-down direction extends between the first lock portion and the first indented portion;

the regulated portion is located downward of the regulating portion in the up-down direction and faces the regulating portion;

the second connector comprises a second terminal and a second holding member;

the second holding member holds the second terminal;

the second terminal has an insertion end portion, a second contact point portion, a second indented portion, and a second lock portion;

the insertion end portion is located at a lower end of the second terminal;

the second indented portion is adjacent to the second lock portion;

the second lock portion is closer to the insertion end portion than the second indented portion is;

a second intersection surface intersecting with the up-down direction extends between the second lock portion and the second intended portion;

the second contact point portion is located upward of the second indented portion in the up-down direction;

in a mated state in which the first connector and the second connector are mated with each other, the second contact point portion is brought into contact with the first contact point portion;

in the mated state, the first lock portion and the second lock portion are located between the first indented portion and the second indented portion in a width direction perpendicular to the up-down direction;

in the mated state, the first lock portion and the second lock portion face each other in the up-down direction, in a contact state in which the first lock portion is bought into contact with the second lock portion and the regulated portion is brought into contact with the regulating portion, a first tangential line at a first contact position between the first lock portion and the second lock portion forms a first angle with the width direction;

in the contact state, a second tangential line at a second contact position between the regulated portion and the regulating portion forms a second angle with the width direction; and the first angle is larger than the second angle.

2. The connector assembly as recited in claim 1, wherein:

the first terminal has an arc-shaped portion;

the first contact point portion and the regulated portion are provided to the arc-shaped portion; and the regulated portion is located upward of the first contact point portion in the up-down direction.

3. The connector assembly as recited in claim 2, wherein:

the regulating portion has an inclined surface obliquely intersecting with both the up-down direction and the width direction; and in the width direction, a position of the inclined surface of the regulating portion overlaps with the arc-shaped portion.

4. The connector assembly as recited in claim 1, wherein at least one of the first intersection surface and the second intersection surface is a flat surface.

5. The connector assembly as recited in claim 1, wherein:

the second terminal has a linear portion extending upward from the second indented portion; and the second contact point portion is provided on the linear portion.

6. The connector assembly as recited in claim 1, wherein:

the first terminal further has a held portion held by the first holding member and a first additional contact point portion located between the held portion and the spring portion;

the second terminal has an additional linear portion extending upward from the insertion end portion;

on the additional linear portion, a second additional contact point portion is provided; and in the mated state, the second additional contact point portion is brought into contact with the first additional contact point portion.

* * * * *